(12) United States Patent
Rudling et al.

(10) Patent No.: US 6,512,806 B2
(45) Date of Patent: *Jan. 28, 2003

(54) COMPONENT DESIGNED FOR USE IN A LIGHT WATER REACTOR, AND A METHOD FOR THE MANUFACTURE OF SUCH A COMPONENT

(75) Inventors: Peter Rudling, Västerås (SE); Lars Hallstadius, Västerås (SE); Gunnar Vesterlund, Västerås (SE)

(73) Assignee: Westinghouse Atom AB, Västerås (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 39 days.

(21) Appl. No.: 09/125,411
(22) PCT Filed: Feb. 21, 1997
(86) PCT No.: PCT/SE97/00298
§ 371 (c)(1),
(2), (4) Date: Nov. 10, 1998
(87) PCT Pub. No.: WO97/31377
PCT Pub. Date: Aug. 28, 1997

(65) Prior Publication Data
US 2001/0019597 A1 Sep. 6, 2001

(30) Foreign Application Priority Data
Feb. 23, 1996 (SE) .............................................. 9600700

(51) Int. Cl.⁷ ................................................ G21C 3/06
(52) U.S. Cl. ...................... 376/412; 376/410; 376/414; 376/416; 376/305
(58) Field of Search ................. 376/410, 412, 376/414, 416, 417, 305

(56) References Cited

U.S. PATENT DOCUMENTS

| | | | | | |
|---|---|---|---|---|---|
| 2,987,352 | A | * | 6/1961 | Watson ........................ | 308/241 |
| 3,909,370 | A | * | 9/1975 | Videm et al. .............. | 204/32 R |
| 4,071,587 | A | * | 1/1978 | Eggers ......................... | 264/0.5 |
| 4,233,086 | A | * | 11/1980 | Vesterlund ................... | 148/6.3 |
| 4,284,660 | A | * | 8/1981 | Donaghy et al. ............. | 427/57 |
| 4,364,781 | A | * | 12/1982 | Vesterlund ................... | 148/6.3 |
| 4,411,861 | A | * | 10/1983 | Steinberg ..................... | 376/417 |
| 4,445,942 | A | * | 5/1984 | Cheng et al. ................. | 148/6.3 |
| 4,659,540 | A | * | 4/1987 | Cheng et al. ................ | 376/417 |
| 4,695,476 | A | * | 9/1987 | Feild, Jr. ......................... | 427/6 |
| 5,026,517 | A | | 6/1991 | Menken et al. ............. | 376/438 |
| 5,188,676 | A | * | 2/1993 | Taylor ......................... | 148/217 |
| 5,265,137 | A | * | 11/1993 | Busch .......................... | 376/414 |
| 5,372,660 | A | * | 12/1994 | Davidson et al. ............ | 148/421 |
| 5,434,897 | A | | 7/1995 | Davies ......................... | 376/416 |
| 5,649,951 | A | * | 7/1997 | Davidson ..................... | 606/198 |
| 6,033,493 | A | * | 3/2000 | Hertz et al. .................. | 148/276 |

FOREIGN PATENT DOCUMENTS

| | | |
|---|---|---|
| DE | 24 29 447 | 1/1976 |
| EP | 0 533 073 A1 | 3/1993 |
| EP | 0 614 195 A1 | 2/1994 |
| JP | 63-179286 | 1/1987 |
| SE | 451 415 | 10/1987 |
| WO | WO 93/1852 | 9/1993 |

* cited by examiner

Primary Examiner—Michael J. Carone
Assistant Examiner—Jack Keith
(74) Attorney, Agent, or Firm—Swidler Berlin Shereff Friedman, LLP

(57) ABSTRACT

A component (1) designed for use in a light water reactor and at least partly comprised by a metal and/or a metal alloy presents a coatings (4, 7) at its outer surface (3) and its inner surface(5). The coating (4 and 7 respectively) has as its task to protect the surface (3 and 5 respectively), against oxidation, corrosion, wear and hydration. The coating (4 and 7 respectively) suitably comprises at least one of zirconium dioxide ($ZrO_2$) and zirconium nitride (ZrN).

13 Claims, 2 Drawing Sheets

COMPONENT DESIGNED FOR USE IN A LIGHT WATER REACTOR, AND A METHOD FOR THE MANUFACTURE OF SUCH A COMPONENT

THE FIELD OF THE INVENTION

The present invention relates to a component designed for use in a light water reactor and at least partly comprised of a metal and/or a metal alloy with at least one surface that presents a coating. The present invention also relates to a method of creating a coating resistant to hydration on at least one surface of a component, which is designed for use in a light water reactor and which is partly comprised of a metal and/or metal alloy by subjecting the component to a treatment with a gas mixture while heating.

BACKGROUND OF THE INVENTION

Components in nuclear plants are often subjected to attacks caused by hydration, oxidation and/or wear, and it is often necessary to deposit a coating onto the surface of the components in order to protect the latter. Cladding tubes for nuclear fuel form an example of such components. In the worst scenario, attacks on a cladding tube for nuclear fuel result in a damage extending through the total thickness of the cladding tube in such a way that the radioactive nuclear fuel inside the cladding tube leaks out to the surroundings. This may be caused by primary as well as secondary damages on the cladding tube.

Primary damages are created by attacks on the outer surface of the cladding tube, the said attacks being caused by oxidation, due to the contact between the cladding tube and the cooling water, or due to wear. A primary damage extending through the total thickness of the cladding tube implies that water, water steam or a combination thereof flows through the damage, so that a space between the fuel and the inner surface of the cladding tube is filled by the water, water steam or the combination thereof. The presence of the water, water steam or the combination thereof in this space implies that the cladding tube runs the risk of being damaged by attacks from inside the tube. This attack often takes place through hydration. Such a damage is called a secondary damage and can only occur when a primary damage already has occurred. Secondary damages extending through the total thickness of the cladding tube result in a leakage of the nuclear fuel inside the cladding tube, and thereby of radioactivity, to the surroundings. Secondary damages can occur at relatively long distances from the primary damage and, therefore, often have the shape of long cracks, which make them a serious type of damage.

A lot of work has been done to develop a coating on such a cladding tube in order to make the coating more resistant to hydration, oxidation and/or wear and thereby able to prevent damages to the cladding tube. Particularly, it has been difficult to produce coatings at the inside of the cladding tube, where the coatings resulting in a good protection against secondary damages. At such a location, a coating which is particularly resistant to hydration is required.

In order to test the resistance to hydration and oxidation of a coating on a cladding tube, a method is normally used where the cladding tube is autoclaved by conditions similar to the ones that the cladding tube is subjected to during use thereof in a nuclear plant, whereafter the presence of hydration and oxidation, respectively by the coating and the cladding tube is examined. The autoclaving of the cladding tube by this method is not to be confused with an autoclaving that may be used for creating protective coatings on cladding tubes. The latter type of autoclaving will be described more in detail later in this text.

Until the seventies, contents of hydrogen in the shape of water in uranium dioxide in fuel pellets resulted in the cladding tube being subjected to hydration at its inside. These damages are called blisters and differ from secondary damages, even though both of them are caused by hydration at the inside of cladding tubes. These uranium is substantially free from hydrogen, and, thereby, the problem with blisters has disappeared.

During the sixties and seventies, a coating was produced in a cladding tube for nuclear fuel by autoclaving the cladding tube in substantially saturated water steam at a temperature of approximately 425° C. and at a pressure of from 0.1 to 0.5 MPa for 24 hours. The result thereby was a coating comprised by zirconium dioxide ($ZrO_2$), which normally had at thickness of from 0.5 to 1 $\mu$m. This coating had a relatively low resistance to hydration and, therefore, it had no substantially protective effect with regard to secondary damages on the cladding tube.

German patent document DE-A-2 429 447 discloses a cladding tube made of zirconium or niobium alloy with a coating comprised by an oxide layer arranged at an inner surface as well as an outer surface of the cladding tube.

During the eighties, a liner layer preferably made of zirconium was applied to the inside of the cladding tube for protection against stress corrosion caused by iodine formed in the uranium dioxide during the fission.

In Japanese patent document JP-A-63 179 286, a liner layer of zirconium on an inner surface of a cladding tube made of zirconium alloy is combined with a subsequent autoclaving which produces a coating of zirconium dioxide on the outer surface of the cladding tube and on the surface of the liner layer. The autoclaving was performed at a pressure of 5 MPa and at a temperature of at least 400° C. The difference between the autoclaving according to this Japanese patent document and the autoclaving according to the method used in the sixties and the seventies described herein is that the autoclaving according to the Japanese patent document takes place in the presence of at most 10% water steam, while the autoclaving according to the technique of the sixties and seventies was performed in the presence of generally 100% water steam. However, in the Japanese patent document, there is only one example of an embodiment with autoclaving in a dry atmosphere. A coating on the liner layer on the inner surface of the cladding tube had a thickness of least 0.2 $\mu$m and preferably 0.5 to 1.0 $\mu$m.

The inventors have experienced that the coating according to Japanese patent document JP-A-63 179 286, in comparison with a coating produced by means of autoclaving in the presence of substantially 100% water steam according to the above technique from the sixties and seventies, results in an improved protection against $H_2$-absorption, but that it does not provide a sufficient barrier against $H_2$-permeation to prevent secondary damages on the cladding tube.

By methods of producing a coating on a surface, where the methods are performed by autoclaving the component under pressure, the reaction speed between active constituents in the gas and the material in the surface of the component is regulated by, amongst other factors, varying the pressure. This is a very bad way of regulating the reaction speed. Relatively small pressure variations during the course of the treatment may cause large variations with regard to the reaction speed, which in turn might lead to the appearance of defects in the coating. Autoclaving according to prior art is therefore performed at a constant pressure, that is, at static conditions.

By a production of a cladding tube designed for use in a light water reactor, a series of annealings of the uncoated cladding tube is performed in order to provide good mechanical properties to the tube. By employing methods according to prior art the cladding tube is then moved to a special final annealing plant which permits treatment under pressure action, for execution of a final annealing and, thereby, a production of a coating. For economical reasons it is not acceptable to execute the annealings of the cladding tube for obtaining good mechanical properties in a plant which makes pressure treatment possible, as these annealings do not require the use of pressure. Therefore, the final annealing, and, thereby, the production of the coating, constitutes one step in the total treatment of the cladding tube, the step being separated from previous treatment steps.

Accordingly, prior art does not offer any coating at the inside of a cladding tube for fuel in a light water reactor, where the coating provides an effective protection against $H_2$-permeation, such that secondary damages may be prevented. Moreover, by methods of prior art, the reaction speed is controlled in an unsatisfying way. Furthermore, prior art requires the use of a particular plant that permits pressure treatment.

SUMMARY OF THE INVENTION

The object of the present invention is to remedy the above problems. More precisely to provide a component which is designed for use in a light water reactor and that has surfaces with a coating that reduces the risk for damages on the component, particularly the risk for secondary damages. An object of the present invention is also to provide a method of producing such a component.

This object is obtained by means of the initially defined component, which is characterized in that the coating comprises at least one of a nitride and an oxide compound, and that the coating has such a thickness that hydration of the component is substantially prevented. The ability of the coating to protect the underlying component against hydration depends upon the resistance of the coating against hydration and of how well it covers the surface of the underlying component. The resistance of the coating against hydration, in its turn, depends on the structure, the composition and the thickness of the coating. Nitride and oxide compounds fulfill these requirements and, therefore, they are usable as a material of the coating, provided that it is of a sufficient thickness to be resistant against hydration.

According to one embodiment of the invention the coating has a thickness of at least 1 $\mu$m and at most 25 $\mu$m. Within this thickness range a coating which has a good resistance against hydration is obtained. By coatings with a thickness smaller than 1 $\mu$m an inferior resistance against hydration is obtained, and by coatings with a thickness larger than 25 $\mu$m the risk of scaling of the coating from the surface of the component is significant. As scaling implies, that significant defects occur in the coating and that the surface of the component becomes unprotected at these defects it is very important to avoid a coating that runs the risk of scaling. According to one application of the embodiment, the coating has a thickness of at least 3 $\mu$m. A thickness of 3 $\mu$m implies that the coating has a better resistance against hydration in comparison with a coating with a thickness of 1 $\mu$m.

According to another embodiment of the invention the component comprises an inner space, and the coating is deposited onto at least one surface in the inner space of the component. Several components in light water reactors, for example tubes, comprise an inner space, and it is often required to protect the surface of this inner space.

According to another embodiment of the invention at least one of the surfaces of the component is comprised of zirconium or a zirconium alloy and the coating comprises at least one of zirconium dioxide ($ZrO_2$) and zirconium nitride (ZrN). Several components in light water reactors are made of zirconium or a zirconium alloy as these materials have properties suitable for the purpose. However, the materials have too insignificant a resistance to hydration, oxidation, corrosion or wear to be used uncoated in light water reactors. Therefore, a coating presenting good such properties is often provided on the surface of the component.

According to another embodiment of the invention, the coating has properties such that oxidation of the component is generally prevented. Such a coating accordingly constitutes a protection against hydration as well as oxidation of the component, which is desirable as the component often is subjected to attacks by hydration as well as oxidation.

According to another embodiment of the invention the coating has properties such that wear of the component is substantially prevented. This is desirable as the component is often subjected to a combination of hydration and wear or hydration, oxidation and wear.

According to another embodiment of the invention the component is a cladding tube for nuclear fuel. According to one application of the embodiment the cladding tube presents a liner layer on the surface of the inner space, and the coating is located upon this liner layer.

According to another embodiment of the invention, the coating on the cladding tube has such a high resistance against hydration that the risk of having secondary damages on the cladding tube is substantially eliminated.

The provision of the coating defined above is obtained by means of the initially defined method, which is characterized in that the treatment is performed at a substantially atmospheric pressure and that the gas mixture comprises water steam and at least one of oxygen, nitrogen, an active gas containing oxygen and an active gas containing nitrogen. It is a significant advantage that the treatment may be performed at atmospheric pressure and, thus, does not require equipment for providing a pressure treatment. Therefore, the treatment at atmospheric pressure implies a saving of both time and money.

According to one embodiment of the method of the invention the coating is produced by making at least one of oxygen, nitrogen, an active gas containing oxygen and an active gas containing nitrogen react with at least one material located in the surface of the component. According to one application of the embodiment the coating comprises least one of an oxide or a nitride of at least one material located in the surface of the component. Such oxides and nitrides normally have a good resistance against hydration, oxidation and wear and the coating therefore provides a good protection for the component against this.

According to another embodiment of the method of the invention the treatment is controlled by adding one or more inert gases suitable in this context. These gases dilute the active gases in such a way that favorable reaction conditions are obtained. The addition of the inert gas or gases results in a reduced reaction speed between the gas and the surface material. If the reaction speed is too high the obtained coating will be full of defects and will not therefore constitute a good protection for the component. If, on the other hand, the reaction speed is too low a coating generally free from defects is obtained, but it takes a lot of time to produce this coating. By controlling the reaction speed at a suitable level it is possible to obtain a coating generally free from defects within a reasonable period of time. This embodiment of the method of the invention provides an effective way of precisely regulating the reaction speed between active constituents in the gas and the surface of the component. By the method according to this embodiment of the present invention it is possible to vary the addition of the inert gas or gases during the time of the treatment, thereby varying the reaction speed. By the method according to the present invention the treatment is thus performed under dynamic conditions, as a difference to autoclaving according to prior art which, as described earlier, is performed under static conditions. According to one application of the method according to this embodiment the inert gases advantageously comprise at least one of the noble gases argon, helium and neon.

According to another embodiment of the method of the invention the treatment is controlled by varying the amount of water steam in the gas mixture. Different surface materials require different amounts of water steam in the gas mixture in order to produce a coating on the component, through a reaction between active constituents in the gas mixture and in the material of the surface of the component, the coating is sufficiently thick for its purpose. According to one application of the embodiment the gas mixture comprises at least 10% water steam. The inventors have experienced that this is a minimum level of water steam required to accomplish coatings with suitable properties.

According to another embodiment of the invention the treatment is performed at such a temperature that an oxidation and a nitration respectively takes place, preferably at a temperature of at least 450° C. and at most 650° C.

According to one application of the method of the invention the gas mixture contains air. Air contains both oxygen and nitrogen in an easily accessible state and is also a cheap alternative which is perfect to use by the method of the invention.

According to another application of the method of the invention the gas mixture is free from nitrogen or active nitrogen compounds. This implies that the created coating definitely is comprised by oxides free from contaminations of nitrides or other nitrogen compounds.

According to another application of the method of the invention the gas mixture comprises carbon dioxide ($CO_2$). According to another application of the embodiment the gas mixture comprises a mixture of carbon monoxide (CO) and carbon dioxide ($CO_2$). These mixtures are added in order to control the oxidation potential.

According to another application of the method of the invention the gas mixture comprises dinitrogen oxide ($N_2O$). Also oxygen and argon may exist together with the dinitrogen oxide in the mixture.

According to one application of the method of the invention the treatment is performed for a period of time of 1 to 10 hours.

According to one application of the method of the invention the surface or the surfaces of the component treated comprise zirconium or a zirconium alloy.

According to another application of the method of the invention the coating produced on the surface or surfaces of the component by the treatment comprises at least one of zirconium dioxide ($ZrO_2$) and zirconium nitride (ZrN).

According to another application of the method of invention the treatment is performed by depositing the coating on at least one of a surface of an inner space and the outer surface of the component.

According to another application of the method of the invention the component treated is a cladding tube for nuclear fuel.

According to another application of the method of the invention the cladding tube is annealed a plurality of times in order to provide mechanical strength, and the treatment mentioned earlier represents a final annealing executed in the same plant as these annealings. During use of the method of the invention no move of the cladding tube to a special final annealing plant is thus required, as the final annealing, and thereby the production of the coating, is performed at atmospheric pressure. The final annealing may therefore be accomplished in the plant where the annealing to obtain a good mechanical strength is performed, and thereby provide an integrated part of the total annealing. The production of the coating accomplished in accordance with the method of the invention thus saves both time and money, compared with if the method according to prior art had been employed instead.

BRIEF DESCRIPTION OF THE DRAWINGS

The present invention will now be described more in detail with reference to the embodiments shown on the attached drawings.

DETAILED DESCRIPTION OF EMBODIMENTS

Figure 1:
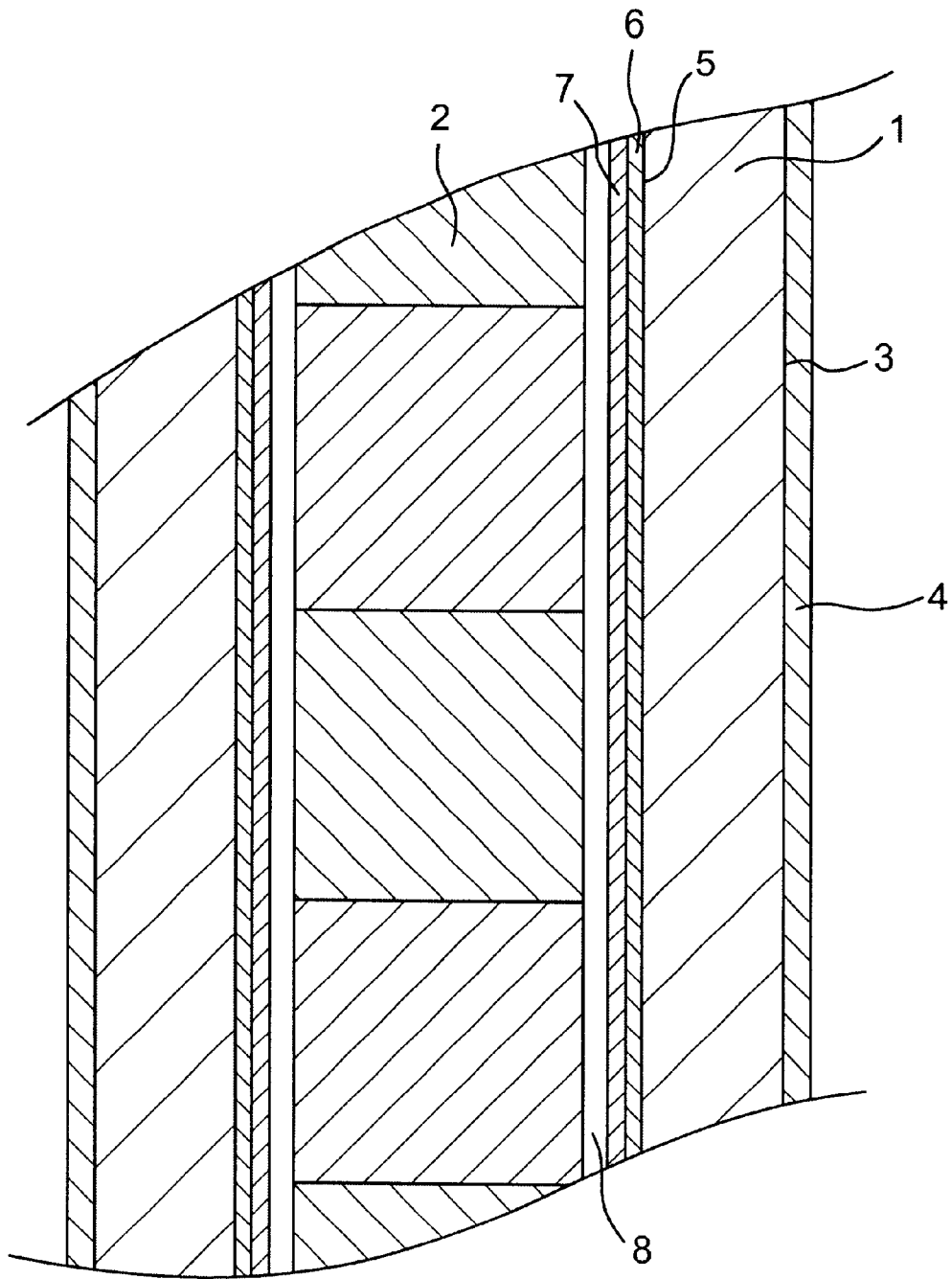
FIG. 1 shows a schematic sectional view of a part of a cladding tube comprising surfaces which present a coating according to the invention.

In FIG. 1 shows a part of a cladding tube 1. The tube is arranged in a light water reactor and nuclear fuel is provided therein as fuel pellets 2. On its outer surface 3, the cladding tube 1 presents a coating 4 according to the invention. The cladding tube 1 also presents a liner layer 6 on its inner surface 5, on which layer a coating 7 according to the invention is provided. The coating 7 may be deposited by means of CVD-technique. By use in a light water reactor the coating 4 on the outer surface 3 of the cladding tube 1 is in contact with a primary cooling circuit that comprises water, water steam or a combination thereof. The coating 4 on the outer surface 3 of the cladding tube 1 has as its task to protect the outer surface 3 of the cladding tube against attacks, preferably caused by oxidation, due to the presence of the water, water steam or the combination thereof, or wear due to the contact with other components in the light water reactor. The coating 4 thus presents a good resistance against oxidation and wear. If, despite this, the coating 4 will get a damage extending through the total thickness of the coating 4, an area of the outer surface 3 of the cladding tube 1 will be exposed to the water, water steam or the combination thereof, whereby this area will oxidate until a damage extending through the total thickness of the cladding tube 1 finally will be created. If the oxidation continues, a damage extending through the total thickness of the liner layer 6 will finally be created. Thereby, a damage extending through the total thickness of the coating 4, the cladding tube 1, the liner layer 6 and the coating 7, a so called primary damage, is formed. In such cases the water, water steam or the combination thereof will penetrate through the primary damage to an inner space 8 between the coating 7 and the fuel pellets 2. Thereby, the water, water steam or the combination thereof will fill the inner space 8 and attack the coating 7. These attacks may occur at long distances from the primary damage and be caused by hydration. Thanks to the coating 7 of the invention having a high resistance against hydration mostly no damages extending through the total thickness of the coating 7 are formed. The coating 7 and the combination of the coating 7 and the liner layer 6 thereby significantly reduce the risk of secondary damages being formed on the cladding tube 1 in comparison with uncoated cladding tubes. It also possible to exclude the liner layer 6 and still obtain a good protection against hydration at the inner surface 5 of the cladding tube 1.

Figure 2:
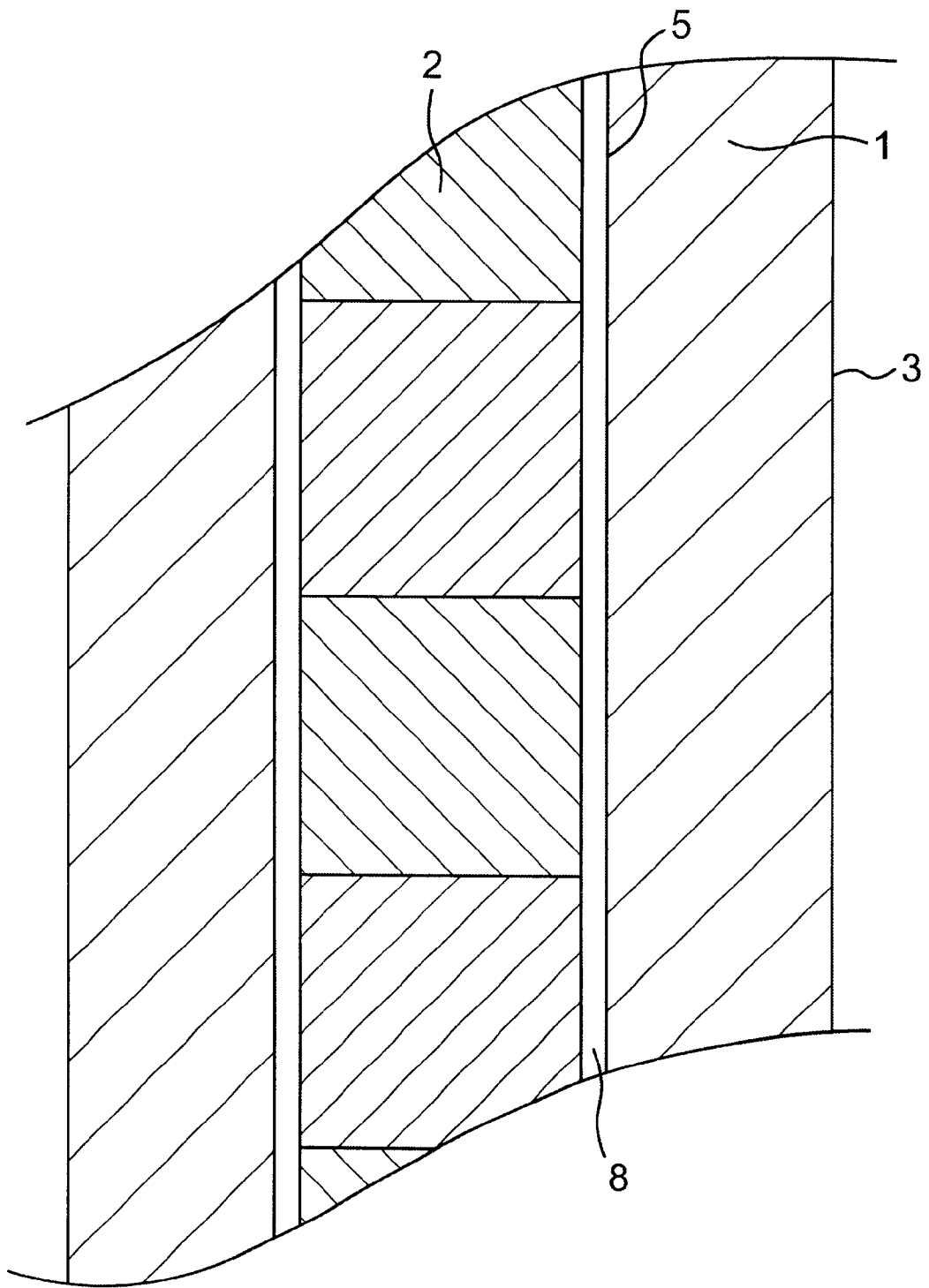
FIG. 2 shows a schematic sectional view of a part of a cladding tube comprising surfaces that are uncoated.

In FIG. 2 shows a part of a cladding tube 1 according to prior art. The tube being arranged in a light water reactor and nuclear fuel is arranged therein as fuel pellets. By use in a light water reactor, an outer surface 3 of the cladding tube 1 is in contact with a primary cooling circuit comprising water, water steam or a combination thereof. Water, water steam or a combination thereof has an oxidating effect on the outer surface 3 of the cladding tube 1. The outer surface 3 of the cladding tube 1 is also subjected to wear from other components present in the light water reactor. The material of the cladding tube 1 has not a sufficient resistance against wear and oxidation to prevent the creation of damages by these attacks. When such a damage is well initiated on the outer surface 3 of the cladding tube 1, through the action of oxidation or wear, the oxidation progresses at the location of this damage. Finally, the result thereof is a damage extending through the total thickness of the cladding tube 1. By such a primary damage the nuclear fuel in the fuel pellets 2 may leak through the damage to the primary cooling circuit and thus spread radioactivity to the circuit. The damage extending through the total thickness of the cladding tube 1 also implies that the water, water steam or the combination thereof from the primary cooling circuit penetrates through the damage into the cladding tube to an inner space 8 located between the fuel pellets 2 and an inner surface 5 of the cladding tube 1. The water, water steam or the combination thereof is spread in the inner space 8 and has a hydrating effect on the inner surface 5 of the cladding tube 1. The material of the cladding tube 1 has not a sufficient resistance against this hydration, and damages will therefore be created on the inner surface 5 of the cladding tube 1. These damages may occur at long distances from the primary damage due to the fact that the water, water steam or the combination thereof causing the damage is spread over so large areas in the inner space 8. The damage created on the inner surface 5 of the cladding tube 1 then grows until, finally, a damage extending through the total thickness of the cladding tube is formed. The nuclear fuel from the fuel pellets 2 may leak out through such secondary damages and further spread radioactivity to the primary cooling circuit.

EXAMPLE 1

An uncoated cladding tube for nuclear fuel with a liner layer provided on an inner surface of the cladding tube was subjected to a final annealing in order to produce a coating according to the invention on an inner surface onto the liner layer as well as an outer surface of the cladding tube. This final annealing was performed at atmospheric pressure by treating the cladding tube for 90 minutes at a temperature of 565° C. under the action of a gas mixture comprising oxygen, argon and water steam. This treatment resulted in a coating of zirconium dioxide ($ZrO_2$) on an inner surface on the liner layer as well as on an outer surface of the cladding tube. This coating presented a good resistance against hydration, oxidation and wear.

EXAMPLE 2

The final annealing was executed in the same way as in example 1 with the only exception that the gas mixture contained nitrogen instead of oxygen. The result thereof was a coating comprised by zirconium nitride (ZrN) on an inner surface, upon the liner layer, and on an outer surface of the cladding tube. This coating had a good resistance against hydration, oxidation and wear.

The thickness of the coating according to the invention may vary from at least 1 μm or at least 3 μm to at most 10 μm or at most 25 μm in order to obtain a good resistance against hydration, oxidation and wear.

Generally, the method comprises the provision of a coating of zirconium oxide or zirconium nitride on the inside of a cladding tube by subjecting said tube to an environment that comprises a controlled gas mixture that comprises metal organic compounds and also one or more other gases, such as oxygen gas, carbon dioxide, methane and/or nitrogen gas. By controlling the temperature, reaction amounts, pressure and gas content of said environment, an even coating which is very dense and resistant to hydration may be provided. The thickness thereof is preferably between 1 and 10 μm.

What is claimed is:

1. A method of producing a coating resistant to hydration on at least one surface of a cladding tube for nuclear fuel for use for use in a light water reactor, the cladding tube comprising a liner layer on an inside of the tube, the liner layer comprising zirconium or a zirconium alloy, the method comprising:

forming a coating at least on a surface of the liner layer that faces an inner space of the cladding tube by subjecting the cladding tube to a treatment with a gas mixture while heating the cladding tube, the treatment being performed at a temperature of about 450° C. to about 650° C. and substantially at atmospheric pressure, the gas mixture comprising water steam and both oxygen gas and nitrogen gas, wherein the coating is formed such that it has a thickness of at least one μm, such that the coating at least forms an innermost surface facing the inner space of the cladding tube.

2. The method according to claim 1, wherein the coating is produced by making at least one of the oxygen gas and nitrogen gas of the gas mixture react with at least one material located in the surface of the liner layer.

3. The method according to claim 1, wherein the coating comprises by at least one of an oxide and a nitride of zirconium.

4. The method according to claim 1, wherein the treatment is controlled by adding at least one gas that is inert at the temperature and pressure of the treatment.

5. The method according to claim 4, wherein the inert gases comprise at least one of argon, helium and neon.

6. The method according to claim 1, wherein the treatment is controlled by varying the amount of water steam in the gas mixture.

7. The method according to claim 1, wherein the coating formed on the surface or the surfaces of the cladding tube during the treatment comprises at least one of zirconium dioxide and zircondium nitride.

8. The method according to claim 1, wherein the cladding tube is annealed a plurality of times prior to the treatment in order to confer mechanical strength, and that the treatment represents a final annealing performed in the same plant as the plurality of annealings.

9. A method according to claim 1, characterized in that the gas mixture contains air.

10. A method according to claim 1, characterized in that the gas mixture comprises further carbon dioxide ($CO_2$).

11. A method according to claim 1, characterized in that the gas mixture comprises further mixtures of carbon monoxide (CO) and carbon dioxide ($CO_2$).

12. A method according to claim 1, characterized in that the gas mixture comprises further dinitrogen oxide ($N_2O$).

13. The method according to claim 1, wherein the treatment is performed for a period of 1 to 10 hours.

* * * * *